US008721447B2

(12) United States Patent
Okada

(10) Patent No.: US 8,721,447 B2
(45) Date of Patent: May 13, 2014

(54) GAME DELIVERY SERVER, GAMING SYSTEM, AND CONTROLLING METHOD FOR GAME DELIVERY SERVER

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1912 days.

(21) Appl. No.: 11/723,263

(22) Filed: Mar. 19, 2007

(65) Prior Publication Data

US 2008/0139319 A1 Jun. 12, 2008

Related U.S. Application Data

(60) Provisional application No. 60/873,567, filed on Dec. 8, 2006.

(51) Int. Cl.

*A63F 13/12* (2006.01)
*G06F 17/00* (2006.01)
*G07F 17/32* (2006.01)

(52) U.S. Cl.

CPC ........ *G07F 17/3225* (2013.01); *G07F 17/3227* (2013.01); *G07F 17/3232* (2013.01); *G07F 17/3234* (2013.01); *G07F 17/3237* (2013.01); *G07F 17/3239* (2013.01)
USPC .................... 463/42; 463/16; 463/20; 463/29

(58) Field of Classification Search

CPC ............ G07F 13/3225; G07F 13/3227; G07F 13/3232; G07F 13/3234; G07F 13/3237; G07F 13/3239
USPC .......................................... 463/42, 16, 20, 29
See application file for complete search history.

(56) References Cited

U.S. PATENT DOCUMENTS 4,856,787 A * 8/1989 Itkis .............................. 273/237
6,645,077 B2 * 11/2003 Rowe .............................. 463/42
6,913,531 B1 * 7/2005 Yoseloff .......................... 463/13
7,399,229 B2 * 7/2008 Rowe .............................. 463/42
7,611,409 B2 * 11/2009 Muir et al. ...................... 463/29
7,666,088 B2 * 2/2010 Cannon ........................... 463/25
7,722,453 B2 * 5/2010 Lark et al. ....................... 463/16
7,753,789 B2 * 7/2010 Walker et al. ................... 463/42
7,802,087 B2 * 9/2010 Gatto et al. ................... 713/100
7,862,427 B2 * 1/2011 Nguyen et al. .................. 463/27
7,867,092 B2 * 1/2011 Paulsen ........................... 463/42
7,887,420 B2 * 2/2011 Nguyen et al. .................. 463/42
7,963,839 B2 * 6/2011 Gatto et al. ..................... 463/16
8,162,755 B2 * 4/2012 Brosnan et al. ................. 463/42
2002/0137217 A1 * 9/2002 Rowe .............................. 436/42
2002/0142825 A1 * 10/2002 Lark et al. ....................... 463/16
2002/0151358 A1 * 10/2002 Walker et al. ................... 463/25
2004/0180712 A1 * 9/2004 Forman et al. .................. 463/17
2004/0198496 A1 * 10/2004 Gatto et al. ..................... 463/42
2004/0248652 A1 * 12/2004 Massey et al. .................. 463/42
2005/0026670 A1 * 2/2005 Lardie ............................ 463/16
2005/0054448 A1 * 3/2005 Frerking et al. ................ 463/42
2005/0096125 A1 * 5/2005 LeMay et al. ................... 463/25

(Continued)

*Primary Examiner* — William H McCulloch, Jr.

(74) *Attorney, Agent, or Firm* — Lexyoume IP Meister, PLLC

(57) ABSTRACT

With a game delivery server, a gaming system and a controlling method for a game delivery server of the present invention, a list of games to be played by a player at a gaming machine can be determined at the game delivery server. Therefore, an administrator of the game delivery server can determine a list of games appropriate for the player. For example, if a player is Japanese, games familiar to Japanese can be listed.

19 Claims, 12 Drawing Sheets

(56) References Cited

U.S. PATENT DOCUMENTS

| | | | | |
|---|---|---|---|---|
| 2005/0143169 | A1* | 6/2005 | Nguyen et al. | 463/25 |
| 2005/0159204 | A1* | 7/2005 | Moshal | 463/17 |
| 2005/0227769 | A1* | 10/2005 | Morrow et al. | 463/42 |
| 2005/0255911 | A1* | 11/2005 | Nguyen et al. | 463/25 |
| 2006/0009273 | A2* | 1/2006 | Moshal | 463/17 |
| 2006/0035713 | A1 | 2/2006 | Cockerille et al. | |
| 2006/0063590 | A1* | 3/2006 | Abassi et al. | 463/29 |
| 2006/0068890 | A1* | 3/2006 | Okada | 463/20 |
| 2006/0068915 | A1* | 3/2006 | Okada | 463/42 |
| 2006/0188855 | A1* | 8/2006 | Okada et al. | 434/227 |
| 2007/0016934 | A1* | 1/2007 | Okada et al. | 725/100 |
| 2007/0016936 | A1* | 1/2007 | Okada et al. | 725/136 |
| 2007/0213117 | A1* | 9/2007 | Okada | 463/16 |
| 2007/0238505 | A1* | 10/2007 | Okada | 463/16 |
| 2007/0238530 | A1* | 10/2007 | Okada | 463/42 |
| 2008/0070679 | A1* | 3/2008 | Seelig et al. | 463/26 |
| 2008/0070698 | A1* | 3/2008 | Park | 463/42 |
| 2008/0076533 | A1* | 3/2008 | Okada | 463/25 |
| 2008/0076551 | A1* | 3/2008 | Okada | 463/31 |
| 2008/0076558 | A1* | 3/2008 | Okada | 463/36 |
| 2008/0076574 | A1* | 3/2008 | Okada | 463/42 |
| 2008/0085752 | A1* | 4/2008 | Okada | 463/20 |
| 2008/0085753 | A1* | 4/2008 | Okada | 463/20 |
| 2008/0090654 | A1* | 4/2008 | Okada | 463/29 |
| 2008/0102936 | A1* | 5/2008 | Okada | 463/25 |
| 2008/0139319 | A1* | 6/2008 | Okada | 463/42 |
| 2008/0176626 | A1* | 7/2008 | Okada | 463/19 |
| 2008/0318669 | A1* | 12/2008 | Buchholz | 463/25 |
| 2009/0170593 | A1* | 7/2009 | Pacey | 463/25 |
| 2009/0204388 | A1* | 8/2009 | Okada | 704/3 |
| 2009/0215513 | A1* | 8/2009 | Okada | 463/17 |
| 2009/0221341 | A1* | 9/2009 | Okada | 463/17 |
| 2009/0228282 | A1* | 9/2009 | Okada | 704/277 |
| 2010/0075746 | A1* | 3/2010 | Anderson et al. | 463/25 |
| 2011/0124405 | A1* | 5/2011 | Okada et al. | 463/25 |

* cited by examiner

GAME DELIVERY SERVER, GAMING SYSTEM, AND CONTROLLING METHOD FOR GAME DELIVERY SERVER

CROSS-REFERENCE TO RELATED APPLICATION

This application is based upon and claims the benefit of U.S. Provisional Patent Application Ser. No. 60/873,567, filed on Dec. 8, 2006; the entire contents of which are incorporated herein by reference for all purposes.

BACKGROUND OF THE INVENTION

1. Field of the Invention

The present invention relates to a game delivery server, a gaming system, and a controlling method for the game delivery server.

2. Description of the Related Art

U.S. Pat. No. 6,645,077, US patent application publication No. 2005/0054448 and US patent application publication No. 2006/0035713 disclose gaming systems which use download technique of game programs via a network. In the gaming system, multiple types of games can be executed in a single gaming machine, and game contents executable on the gaming machine in the network can be changed.

In the above gaming system, game software is downloaded from a server to each of gaming machines, and the downloaded game software is executed on each gaming machine so that the game is played.

Therefore, such a gaming system is demanded that has new entertainment characteristics which can provide a gaming environment preferred by players.

SUMMARY OF THE INVENTION

A game delivery server of the first present invention comprises, an input port to which player information sent from a gaming machine connected via a network is input; a memory for storing multiple types of game software to be delivered to the gaming machine; and a controller. The controller is operable to: (a) classify the multiple types of game software into selectable game software and unselectable game software based on the player information, (b) deliver a list of game software determined from among the selectable game software according to an external input to the gaming machine via the network, and (c) read the game software of the game selected at the gaming machine out of the memory and deliver it to the gaming machine.

A game delivery server of the second present invention comprises, a first input port to which player information sent from a gaming machine connected via a network is input; a memory for storing multiple types of game software to be delivered to the gaming machine in association with language data in execution, respectively; a second input port to which a first external signal for selecting multiple game software from among selectable game software in the multiple types of game software is input; a third input port to which a second external signal for selecting a language in execution of the game software is input; and a controller. The controller is operable to (a) classify the multiple types of game software into the selectable game software and unselectable game software based on the player information, (b) deliver a list of game software determined from among the selectable game software according to the first external input to the gaming machine via the network, and (c) read the game software of the game selected at the gaming machine and the language data set by the second external signal out of the memory and deliver them to the gaming machine.

A game delivery server of the third present invention comprises, a first input port to which player information sent from a gaming machine connected via a network is input; a memory for storing multiple types of game software to be delivered to the gaming machine in association with currency data to be used, respectively; a second input port to which a first external signal for selecting multiple game software from among selectable game software in the multiple types of game software is input; a third input port to which a second external signal for selecting a currency in execution of the game software is input; and a controller. The controller is operable to (a) classify the multiple types of game software into the selectable game software and unselectable game software based on the player information, (b) deliver a list of game software determined from among the selectable game software according to the first external input to the gaming machine via the network, and (c) read the game software of the game selected at the gaming machine and the currency data set by the second external signal out of the memory and deliver them to the gaming machine.

The gaming machine is not particularly limited. The gaming machines may include gaming machines such as slot machine, personal computers, and personal digital assistants, for example. Games to be played in the gaming machine are not particularly limited. The games may include video bingo games, video lottery games, video blackjack games, video slot games, mechanical slot games, video poker games, video keno games, video pachinko games, video card games, and video games of chance.

Hardware configuration of the game delivery server is not particularly limited provided that it functions as the game delivery server of the present invention. As the game delivery server, a general-purpose server may be employed. In addition, the game delivery server may include a firewall and a modem. The game delivery server may comprise a single device or multiple devices. Any of the gaming machines having a firewall and a modem may be configured to function as the game delivery server.

DETAILED DESCRIPTION OF THE EMBODIMENT

Figure 1:
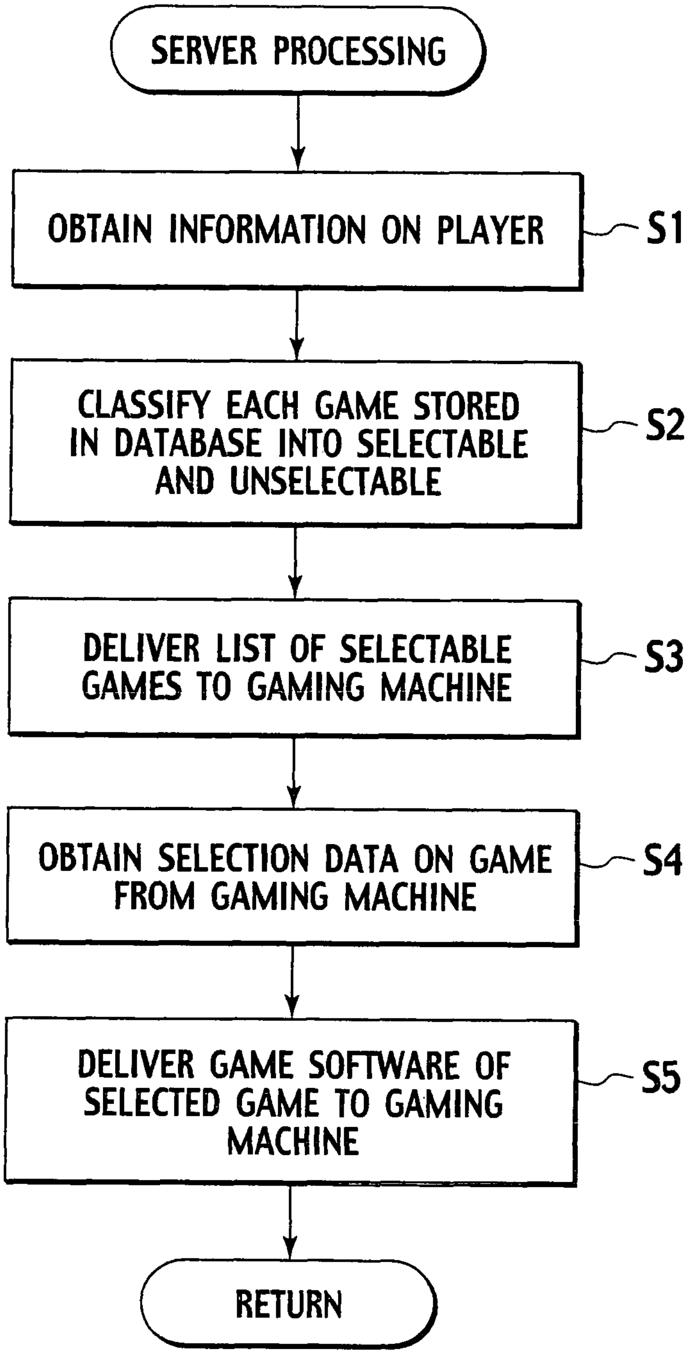
FIG. 1 is a flow chart schematically illustrating a processing procedure of a game controlling method according to the present invention.

FIG. 1 is a flow chart schematically illustrating the controlling method of a game delivery server according to the present invention. Based on this flowchart, a schematic operation of the game delivery server according to the present invention will be described. A slot machine is used in the following description as an example of a gaming machine connected with the game delivery server via a network. However, the present invention is not limited to this but may be applied to other gaming machines.

First, the game delivery server obtains player information on a player who is to play a game on this gaming machine from the gaming machine (slot machine) connected via the network (Step S1). This player information includes types of games played by this player in the past and points awarded to the player through execution of the games.

The game delivery server classifies the games (game software) stored in the database into selectable games and unselectable games based on the points included in the player information (Step S2). In this processing, for example, threshold value for the points is set in advance and classification into the selectable games and unselectable games is made based on whether the points included in the player information are not more than the threshold value or exceed the threshold value. The points are awarded according to the player's past game execution amount. The game execution amount here means the number of credits consumed by the player or the number of games played by the player. One point is awarded when 100 coins are consumed or one point is awarded when the game is played 100 times, for example.

Then, the game delivery server delivers a game list selected by an administrator of the game delivery server among the selectable games to the gaming machine via the network (Step S3). For example, if ten games A1 to A10 are set as selectable and the administrator selects six games A1 to A6 of them, the list of these six games A1 to A6 is delivered to the gaming machine.

After that, the game delivery server obtains selection data sent from the gaming machine and indicating one game selected from the above game list (Step S4).

Then, the game delivery server reads the selected game (game software) out of the database and delivers it to the gaming machine (Step S5).

In this configuration, the administrator of the game delivery server selects some of the game software (six games, for example) according to the player of each gaming machine from among the selectable game software (10 games, for example) and delivers the list of the game software to each gaming machine to prompt selection of the game software. For example, suppose that the administrator of the game delivery server is a shop attendant of a casino hotel and the player is Japanese, a mahjong game or the like which can be easily understood by Japanese can be set as selectable.

Figure 2:
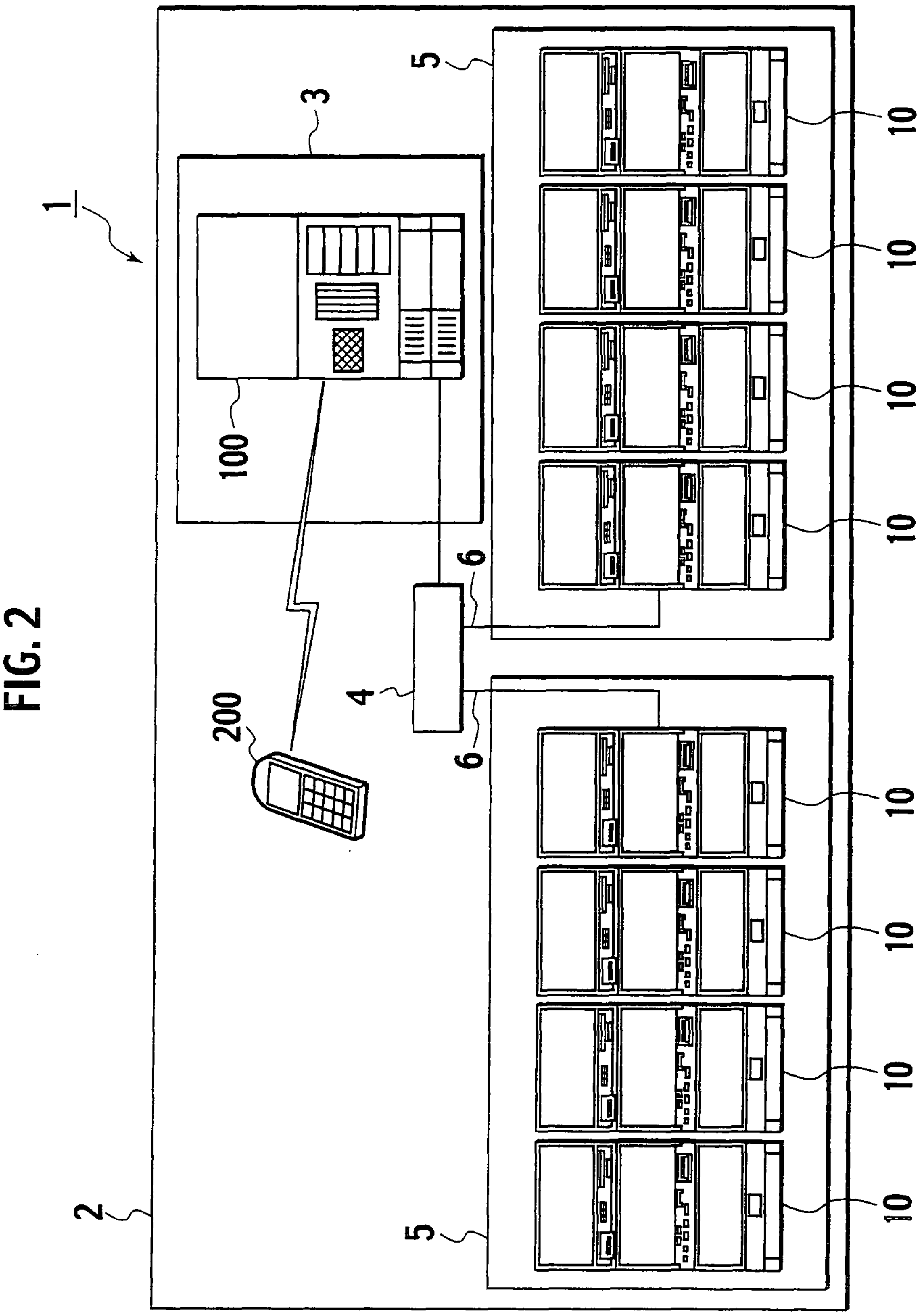
FIG. 2 is a schematic view of a network of a gaming system according to one embodiment of the present invention.

FIG. 2 is a block diagram schematically illustrating a gaming system according to an embodiment of the present invention. A gaming system 1 shown in FIG. 2 is provided with a game delivery server 100 installed in a casino 2 and a plurality of slot machines (game machines) 10.

The game delivery server 100 is installed in a computer room 3 in the casino 2. Also, the plurality of slot machines 10 are installed on a casino floor 5. The game delivery server 100 and the plurality of slot machines 10 are connected by a LAN 6 through a router 4. A remote controller 200 is held by the administrator in the casino 2. The remote controller 200 is capable of wireless communication with the game delivery server 100. Therefore, the administrator can communicate with the game delivery server 100 using the remote control 200 in the computer room 3 or on the casino floor 5.

The game delivery server 100 includes a management tool and a download tool or the like. The administrator can manage information on a group of the slot machines 10 and access to the game delivery server 100 by the management tool. The administrator of the game delivery server 100 who has an appropriate access right can change setting of various programs such as game software.

The slot machine 10 corresponds to a gaming machine in the present invention. However, in the present invention, the gaming machine is not limited to this example. A gaming machine may be a video slot machine, a mechanical slot machine, or a gaming machine capable of executing a bingo game, a keno game, a lottery game and the like.

The slot machines 10 are installed on the casino floor 5. However, in the present invention, a place where the gaming machines are installed is not particularly limited. The installation space for the gaming machines may include casinos, stores, restaurants, bars, boats or the like. Also, the installation place for the gaming machines may be owned or operated by a plurality of administrators. Moreover, the gaming system of the present invention may comprise multiple types of installation places.

Each slot machine 10 sends game processing information (number of inserted coins or payout coins, for example), game software information (software version information or the like), and player information (ID code or the like of the player) to the game delivery server 100. Also, each slot machine 10 can send/receive information to/from the game delivery server 100 and communicate with the game delivery server 100 through the router 4.

Figure 3:
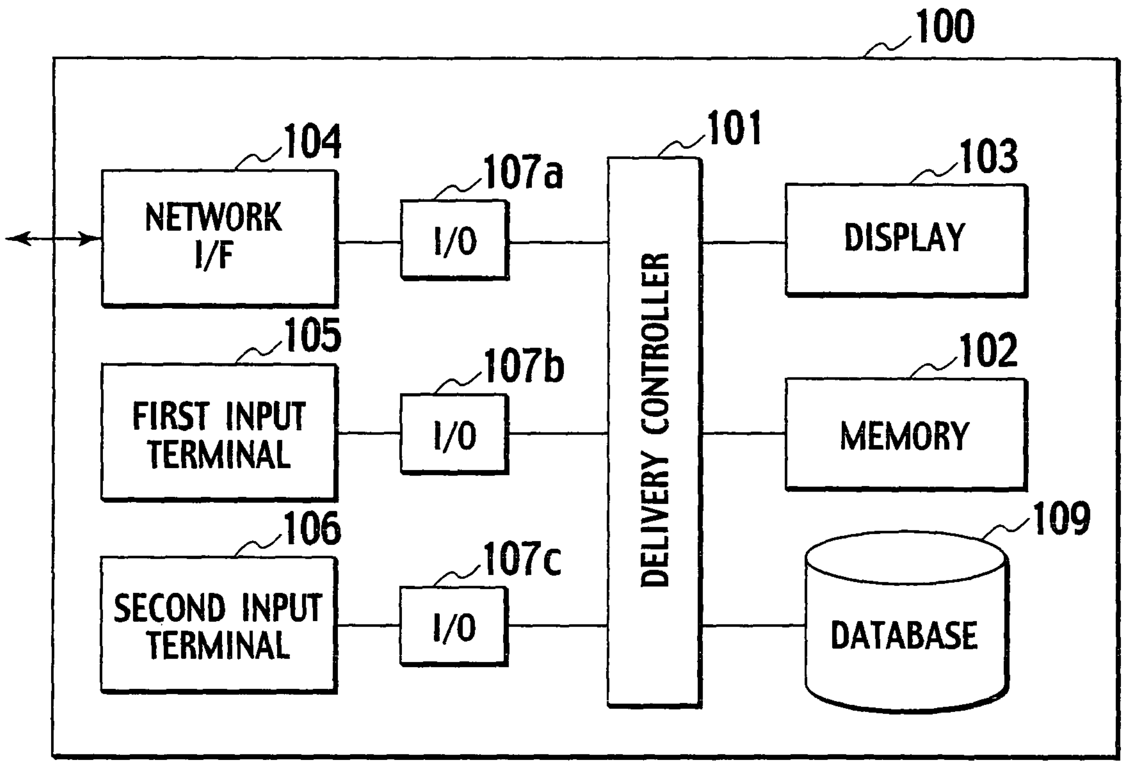
FIG. 3 is a block diagram illustrating the internal configuration of the server according to the one embodiment of the present invention.

FIG. 3 is a block diagram illustrating the internal configuration of the game delivery server according to the embodiment of the present invention. The game delivery server 100 is provided with a delivery controller 101. A memory 102, a database 109 and a display 103 are connected to the delivery controller 101. The delivery controller 101 is the controller of the present invention.

Also, input/output ports 107*a* to 107*c* are connected to the delivery controller 101. Among them, the input/output port (first input port) 107*a* is connected to a network interface 104. The input/output port (second input port) 107*b* is connected to a first input terminal 105. The input/output port (third input port) 107*c* is connected to a second input terminal 106.

The game delivery server 100 can communicate with the slot machine 10 and the remote controller 200 through the network interface 104.

The administrator of the game delivery server 100 inputs a selectable game list for each slot machine 10 using the first input terminal 105. Also, the administrator of the game deliver server 100 sets a language and a currency to be used at execution of the game at each slot machine 10 using the second input terminal 106.

Here, an input signal for setting the selectable game list for the slot machine 10 is a first external signal, and an input signal for setting the language/currency used at execution of the game at the slot machine 10 is a second external signal.

The first input terminal 105 and the second input terminal 106 may be a keyboard, a mouse, a track-ball or any other operation switch. Also, the network interface 104 may be any of a wired or wireless network interface, or may include both.

The game delivery server 100 is provided with a firewall (not shown), which blocks unauthorized access to programs in the game delivery server 100.

Figure 4:
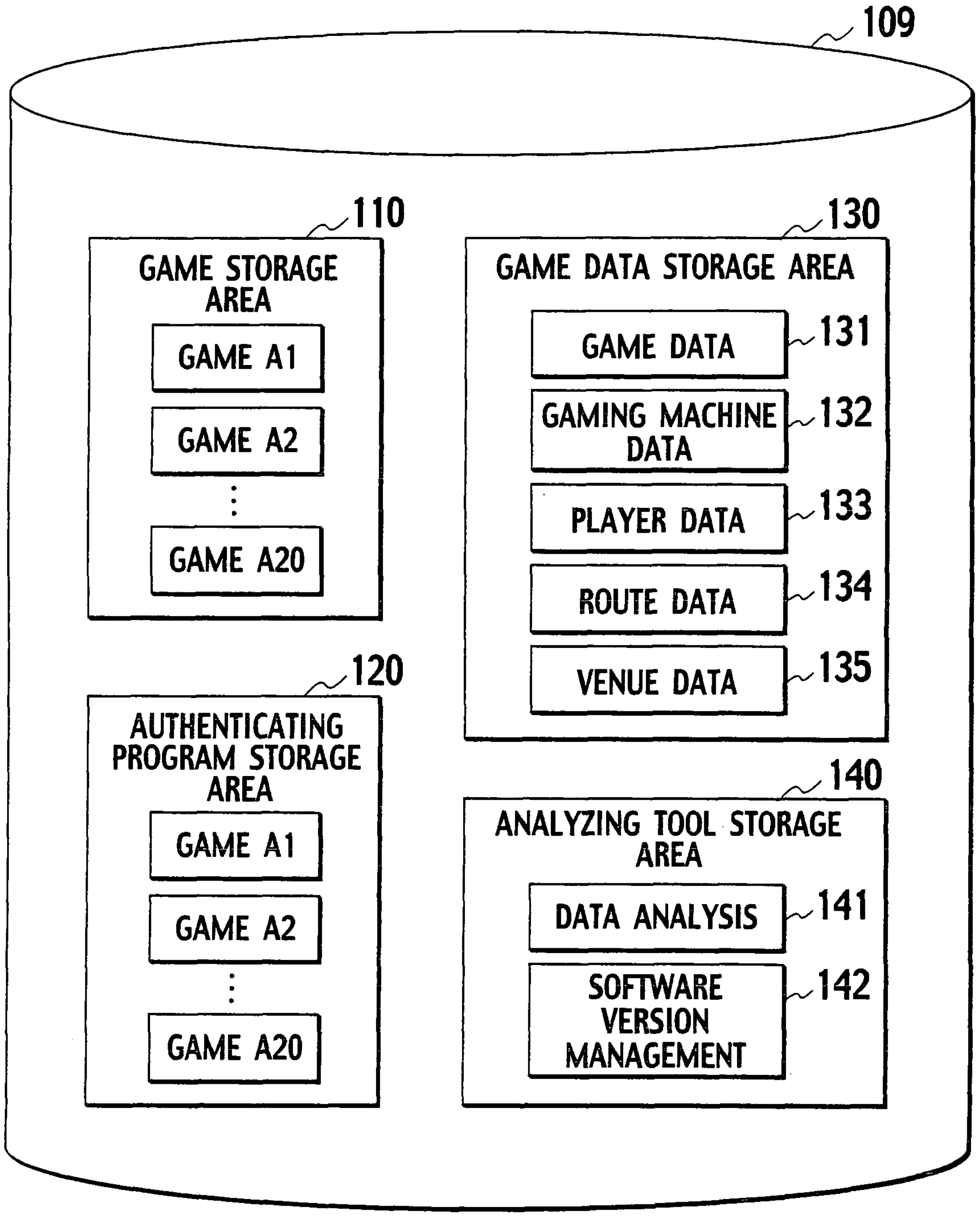
FIG. 4 is a block diagram illustrating the internal configuration of a database installed on the server according to the one embodiment of the present invention.

FIG. 4 is a block diagram showing the internal configuration of the database 109. The database 109 is stored in a hard disk drive. As shown in FIG. 4, the database 109 includes a game storage area 110, an authenticating program storage area 120, a game data storage area 130 and an analysis tool storage area 140. The game storage area 110 stores multiple types of games A1 to A20. The authenticating program storage area 120 stores an authenticating program corresponding to each of the games A1 to A20. The analysis tool storage area 140 stores an analysis tool. In the present invention, the database 109 may be stored in a known storage media such as a CD-RW drive or a combination of various recording media, not limited to a hard disk drive.

The game storage area 110 stores game software of multiple types of games (20 types of games A1 to A20 in this embodiment). Each game software includes game system program, payout tables, bonus execution programs, game execution program, graphic data, image display control data, sound data, light emitting pattern data, game jurisdiction information, game language data, game currency data and the like.

The game system program of the game software used in the slot machine 10 includes, for example, a symbol selection program. This symbol selection program determines a symbol rearranged on a liquid crystal panel of a lower display 16 (See FIG. 5) as a symbol matrix. The symbol selection program includes symbol weighting data corresponding to each of multiple types of payout rates (80%, 84%, and 88%, for example).

The symbol weighting data indicates a correspondence between each symbol and one or more random number values belonging to a predetermined numerical range (0 to 255). The payout rate is determined based on setting information determining a redemption rate to the player in the game. The symbols to be rearranged as the symbol matrix are determined based on the symbol weighting data corresponding to this payout rate.

The game language data is data of a language used when the respective game software is executed. For example, a plurality of languages including English, Japanese, German, French, Chinese and the like are set for each of the games A1 to A20. As will be described later, one of these languages can be selected by the administrator of the game delivery server 100.

The currency data is data of a currency used when the respective game software is executed. A plurality of currencies including U.S. “dollar”, Japanese “yen”, British “pound” and the like are set. As will be described later, one of these plural currencies can be selected by the administrator of the game delivery server 100.

In the authenticating program storage area 120, an authenticating program corresponding to the respective game software is stored. The authenticating program includes a hash value generated from legitimate game software and a program which generates a hash value using a hash function from the game software to be authenticated.

The hash function is not particularly limited and SHA (SHA-1, SHA-256, SHA-384, and SHA-512), MD5 or the like may be employed. In the present embodiment, a program which determines the presence of falsification using the hash function will be described as the authenticating program. However, in the present invention, the authenticating program is not particularly limited and any known authenticating programs may be employed.

The game data storage area 130 includes game data 131, gaming machine data 132, player data 133, route data 134, and venue data 135.

The game data 131 includes the number of inserted coins, the number of paid-out coins, the number of bets per game, or the like.

The gaming machine data 132 includes, for example, playing history data for each slot machine 10. This data is stored in association with an ID code of each slot machine 10. The player data 133 includes data relating to gaming history for each player (gaming history data). This data is stored in association with an ID code of each player.

The route data 134 includes, for example, connection information between gaming machines at a plurality of installation places. The venue data 135 includes, for example, information on the gaming machines belonging to each installation place.

The analysis tool storage area 140 includes an application for data analysis 141 and an application for software version management 142. The data analysis 141 sets a category of the game data storage area 130 or a relation between respective categories. The software version management 142 manages a game software version in each gaming machine or a game software version to be downloaded. The delivery controller 101 is capable of management and analysis of various data stored in the database 109 by executing these applications.

Figure 5:
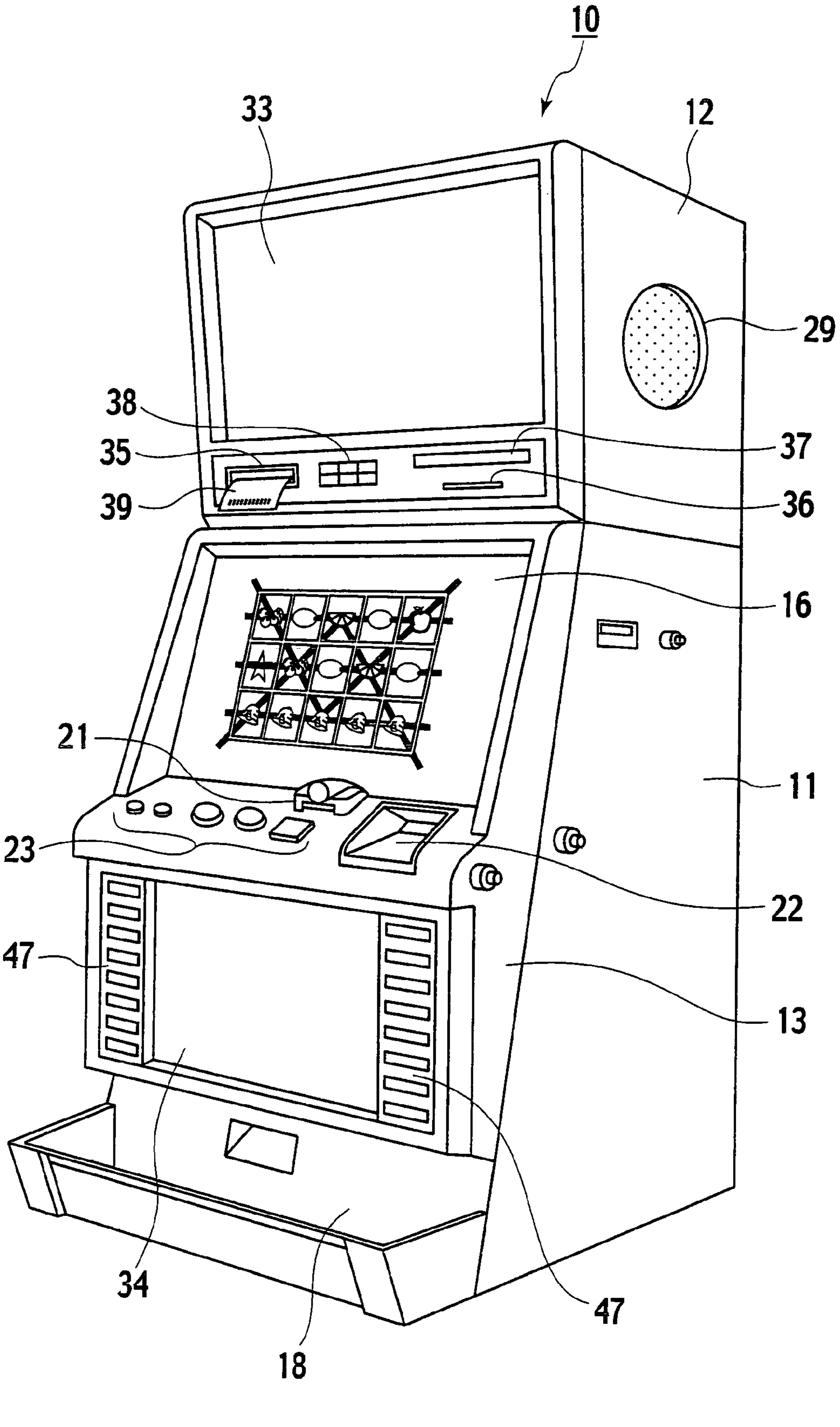
FIG. 5 is a perspective view illustrating an appearance of a slot machine (gaming machine) according to the one embodiment of the present invention.

FIG. 5 is a perspective view illustrating an appearance of the slot machine (gaming machine) 10 connected with the game delivery server 100 according to the embodiment of the present invention via the network. The slot machine 10 includes a cabinet 11, a top box 12 provided on top of the cabinet 11, and a main door 13 provided on the front face of the cabinet 11. A lower display 16 is provided on the front face of the main door 13. The lower display 16 has a liquid crystal panel, on which the symbol matrix composed of 5 columns by 3 rows, totaling in 15 symbols, is displayed.

Furthermore, a touch screen 69 (See FIG. 6) is provided on the front face of the lower display 16. The player can input various instructions via the touch screen 69. Additionally, below the lower display 16, various input buttons 23 for inputting the player's instruction relating to progress of a game is input, a coin insertion slot 21 for accepting coins, a bill validator 22 for identifying validity of bills and accepting legitimate bills are provided. The bill validator 22 can read a barcode ticket 39.

On the front face at a lower part of the main door 13, a foot display 34 is provided. The foot display 34 displays predetermined images based on image display control data included in the game software being executed. As such images, for example, characters of the slot machine 10 and the like are included.

On both sides of the foot display 34, lamps 47 are provided. The lamp 47 emits light in a pattern according to light emitting pattern data included in the game software being executed.

On the front face of the top box 12, an upper display 33 is provided. The upper display 33 has a liquid crystal panel. The upper display 33 displays a payout table and the like.

In addition, a speaker 29 is provided in the top box 12. Below the upper display 33, a ticket printer 35, a card reader 36, a data display 37, and a keypad 38 are provided. The ticket printer 35 prints and outputs a barcode ticket 39. The coded data on the barcode ticket 39 includes the number of credits, date, and an identification number of the slot machine 10 and so on. The player can use the barcode ticket 39 at another slot machine to play a game and exchange it with bills or the like at a predetermined spot in a gaming facility (cashier in a casino, for example).

The card reader 36 can have a smart card inserted therein, and read data from or write data into the inserted smart card. The smart card is carried by the player, which stores data for identifying the player, data relating to the history of the games (gaming history data). The gaming history data includes game type information relating to games which have been played, or points awarded at games played in the past and the like. The card reader 36 corresponds to the player data reader in the present invention.

The smart card may have data corresponding to coins, bills or credits stored therein. Additionally, a magnetic stripe card may be employed in place of the smart card. The data display 37, comprising a fluorescent display or the like, displays data being read by the card reader 36, or data input by the player via the key pad 38, for example. Below the foot display 34 is provided a coin payout opening 18.

Further, in place of the smart card, a card employing RFID system and capable of data read and write in non-contact manner may be used. The key pad 38 is used for inputting instructions and data relating to issuance of tickets or the like.

Figure 6:
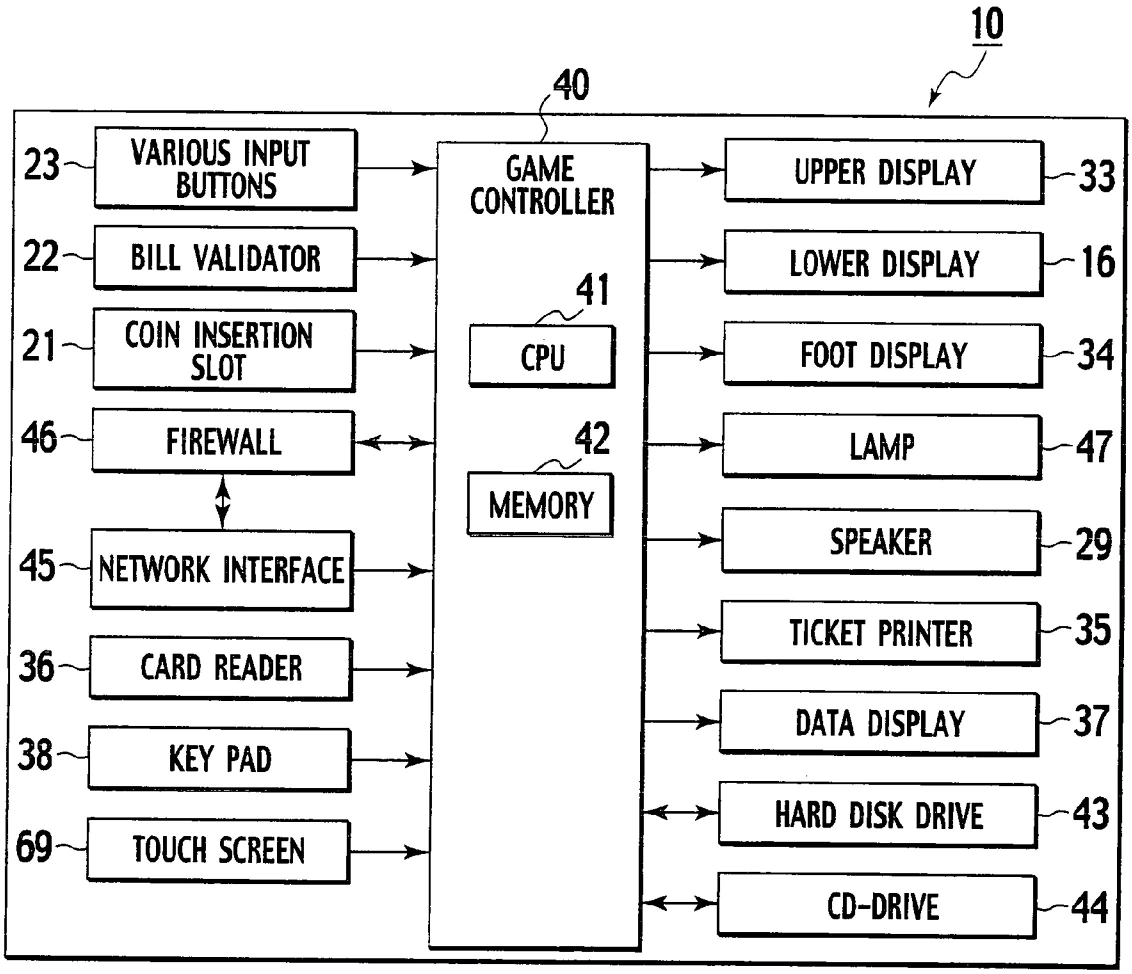
FIG. 6 is a block diagram illustrating the internal configuration of the slot machine shown in FIG. 5.

FIG. 6 is a block diagram illustrating the internal configuration of the slot machine shown in FIG. 5. The slot machine 10 is provided with a game controller 40 including a CPU 41 and a memory 42. Various input buttons 23, the bill validator 22 and the coin insertion slot 21 are connected to the game controller 40. Also, a network interface 45 is connected to the game controller 40 through a firewall 46. Furthermore, the card reader 36, the key pad 38 and the touch screen 69 are connected to the game controller 40.

In addition, the upper display 33, the lower display 16, the foot display 34, the lamps 47, the speaker 29, the ticket printer 35, the data display 37, a hard disk drive 43 and a CD-drive 44 are connected to the game controller 40. The game software downloaded from the game delivery server 100 is stored in the hard disk drive 43 or the like.

The game controller 40 executes, for example, various programs included in the game software stored in the hard disk drive 43 or the like. The game controller 40 executes, for example, the process of displaying images on the upper display 33, the lower display 16 and the foot display 34, the process of outputting sound from the speaker 29 and the process of controlling light emission from the lamps 47.

Figure 7:
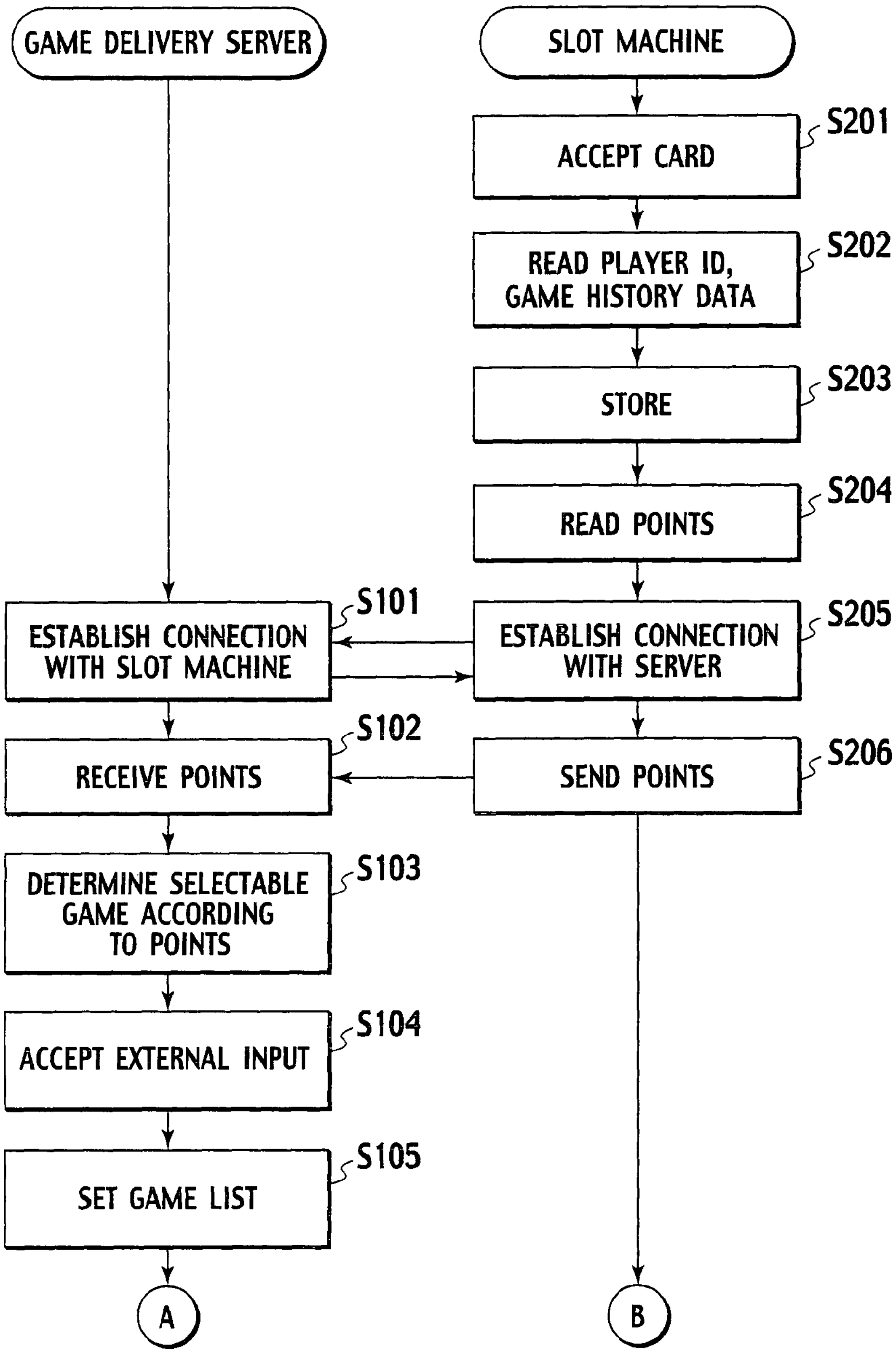
FIG. 7 is a first section of a flowchart illustrating a processing executed at the server and the slot machine according to the one embodiment of the present invention.
Figure 8:
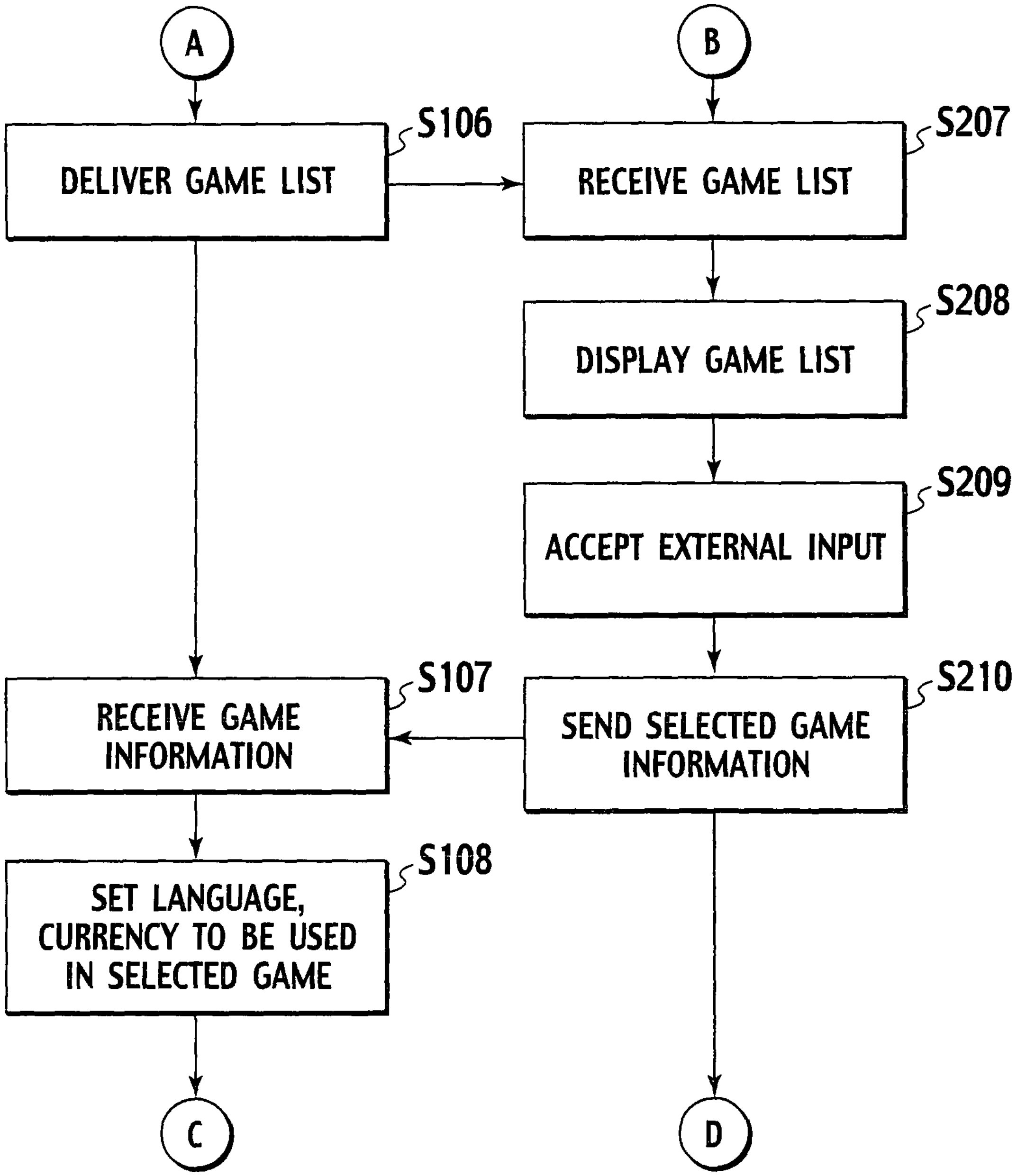
FIG. 8 is a second section of a flowchart illustrating a processing executed at the server and the slot machine according to the one embodiment of the present invention.
Figure 9:
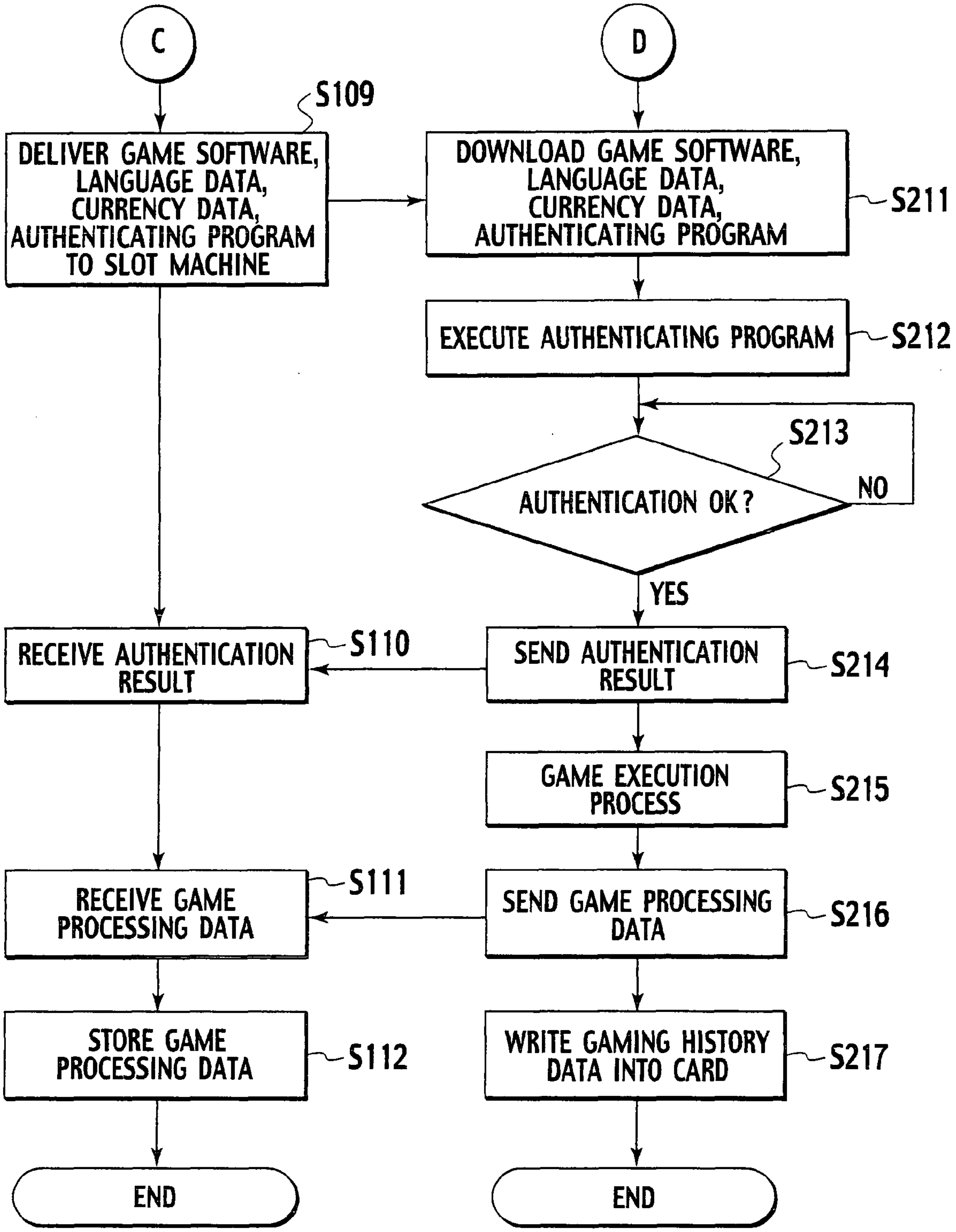
FIG. 9 is a third section of a flowchart illustrating a processing executed at the server and the slot machine according to the one embodiment of the present invention.

FIGS. 7 to 9 are flowcharts illustrating the processing procedure executed between the game delivery server 100 according to the embodiment of the present invention and the slot machine 10.

First, the game controller 40 of the slot machine 10 (gaming machine) accepts insertion of the smart card (Step S201) When the player inserts the smart card into the card reader 36, the game controller 40 reads the player's ID code and gaming history data relating to past games played by the player stored in the smart card (Step S202). Then, the player's ID code and gaming history data are stored in the hard disk drive 43 (Step S203).

The gaming history data includes game type information relating to past games played by the player and points awarded at the past game played by the player. The points are awarded according to the game execution amount such as the consumed credits or the number of played games. For example, if 100 coins have been consumed or if 100 games have been played, one point is awarded.

Then, the game controller 40 reads out the points accumulated by the player in the past from the gaming history data (Step S204).

The game controller 40 accesses the game delivery server 100 and establishes connection with the game delivery server 100 (Step S205, S101).

When the connection between the game delivery server 100 and the slot machine 10 is established, the game controller 40 of the slot machine 10 sends the points accumulated by the player in the past to the game delivery server 100 (Step S206).

The game delivery server 100 receives the points sent by the slot machine 10 (Step S102).

The delivery controller 101 of the game delivery server 100 determines games selectable by the player of the slot machine according to the received points (Step S103). In this processing, the delivery controller 101 reads out a point threshold value stored in the memory 102 in FIG. 3 in advance and determines if the points sent from the slot machine 10 has reached this threshold value or not. Then the delivery controller 101 determines selectable game software and unselectable game software among the multiple types of game software stored in the database 109 based on this determination.

For example, such a case will be described that the threshold value is set to "50 points", the game software of 20 games A1 to A20 are stored in the database 109, and 10 games A11 to A20 are set as selectable only for the players whose points exceed the "50 points". In this case, if the points read out of the game history of the player playing on the slot machine 10 are not more than the "50 points", the games A1 to A10 are set as selectable. If the points read out of the game history of the player playing on the slot machine 10 exceed the "50 points", the games A1 to A20 are set as selectable.

Therefore, the player who has accumulated points exceeding the point set as the threshold value ("50" points, for example) (in other words, the player who has played many plays in the past) can make selection from more games. The above threshold value can be changed as appropriate through operation by the administrator of the game delivery server 100.

Also, the games played by the player in the past may be set as selectable games regardless of the points. For example, the player who has points exceeding the "50 point" in the past and has played the game A20 can select the game A20 even if the points become not more than the "50 points" due to subsequent consumption of the points.

Then, the delivery controller 101 accepts external input by the administrator of the game delivery server 100 (Step S104). In this processing, operation of the first input terminal 105 and the second input terminal 106 shown in FIG. 3 are effected so that the external input by the administrator can be accepted.

Figure 10:
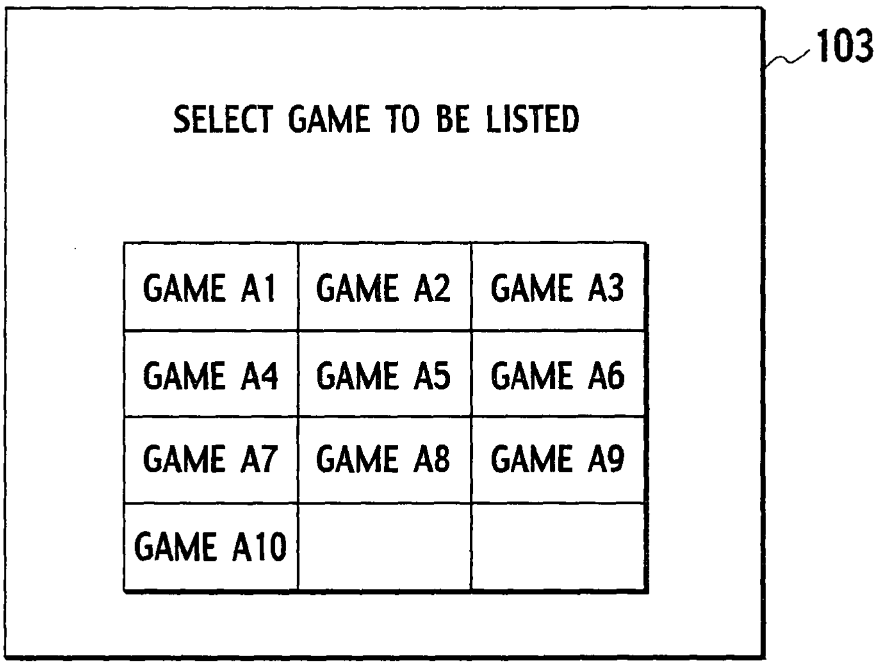
FIG. 10 is an explanatory diagram illustrating an image displayed on a display of the game delivery server according to the one embodiment of the present invention.

In detail, a selection operation of the game to be set in a delivery list to the slot machine 10 from among multiple selectable games is accepted through the first input terminal 105. For example, when ten games A1 to A10 are set as selectable games, as shown in FIG. 10, the selectable ten games A1 to A10 are displayed on the display 103 (See FIG. 3). At the same time, a sentence "Select a game to be listed" is displayed and the selection operation by the administrator is accepted. And the administrator of the game delivery server 100 sets six games (games A1 to A6, for example) among the ten games A1 to A10 as a delivery list to the slot machine 10 (Step S105).

In this processing, the administrator can select games to be listed. Due to this, if a player of the slot machine 10 is Japanese, the administrator makes setting according to the player such as listing of "mahjong game", which is familiar to Japanese. Alternatively, a game played by the player on the slot machine 10 in the previous time may be automatically set in a list.

Then the game list set at Step S105 is delivered to the slot machine 10 through the network interface 104 (Step S106 in FIG. 8).

The slot machine 10 receives the game list delivered from the game delivery server 100 (Step S207).

Figure 11:
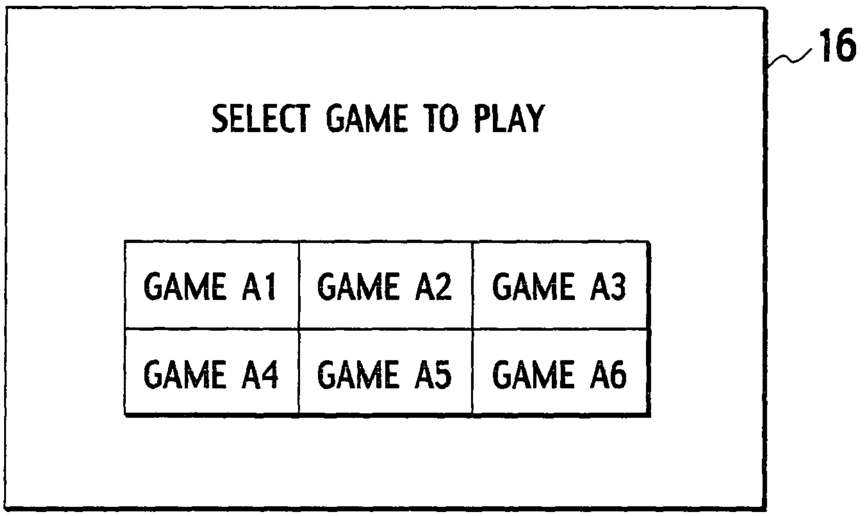
FIG. 11 is an explanatory diagram illustrating an image displayed on a lower display of the slot machine according to the one embodiment of the present invention.
Figure 12:
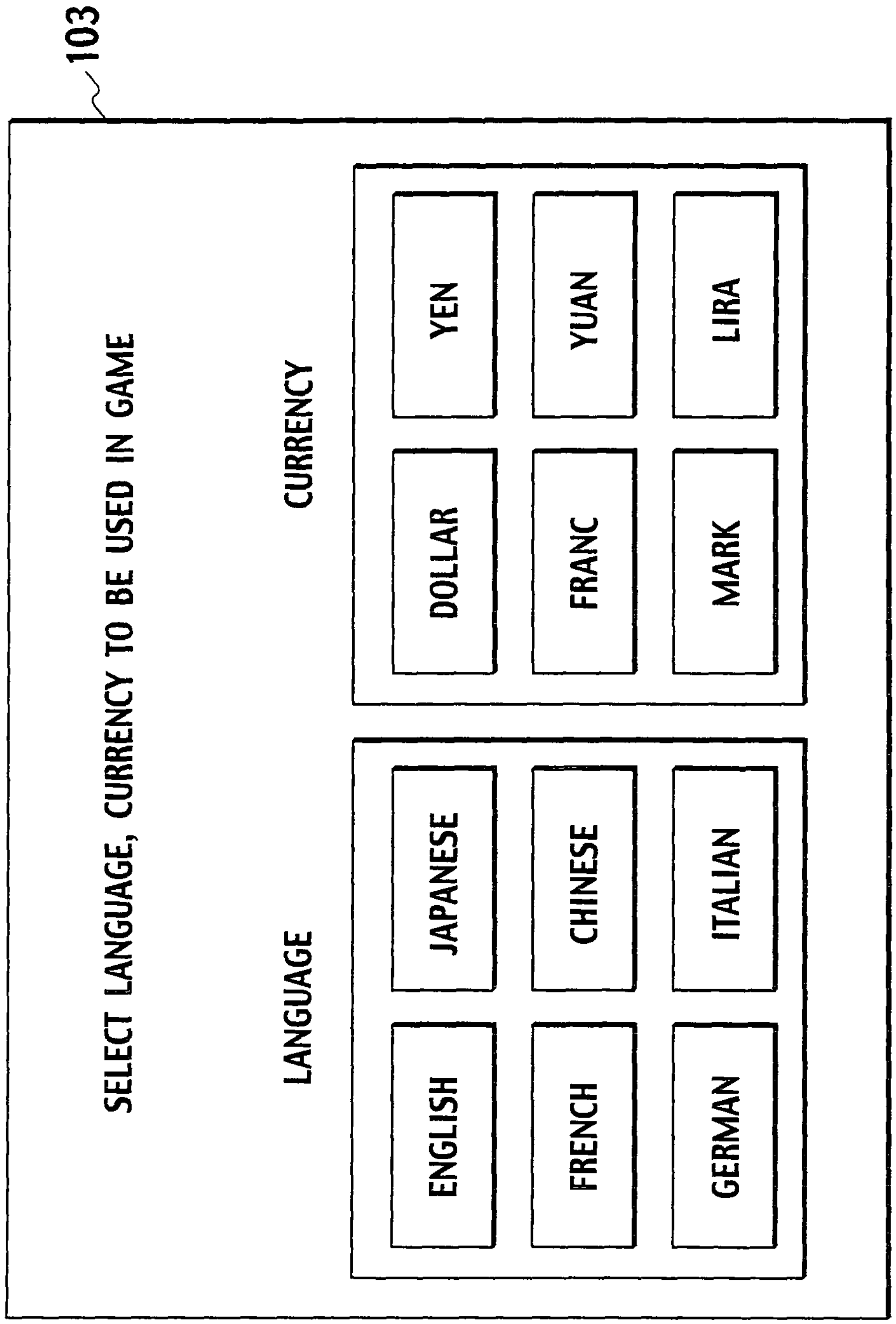
FIG. 12 is an explanatory diagram illustrating an image displayed on a display of the game delivery server according to the one embodiment of the present invention.

The game controller 40 of the slot machine 10 stores the received game list in the memory 42 and moreover, displays the game list on the lower display 16 (See FIG. 5) (Step S208). As a result, the six listed games A1 to A6 are displayed on the lower display 16 as shown in FIG. 11. At the same time, a sentence "Select a game to be played" is displayed. By this, the selection operation by the player is prompted. When the six games A1 to A6 are displayed, the name of each game, a game screen thumbnail of these games and the like are displayed so that the player can recognize them easily.

Also, the operation on the touch screen 69 provided on the lower display 16 is effected so as to accept the selection operation by the player (Step S209). By this, the player of the slot machine 10 can select one game from the six listed games A1 to A6.

The game controller 40 recognizes the game selected through the touch screen 69 and sends information on the selected game to the game delivery server 100 through the network interface 45 (Step S210).

The delivery controller 101 receives the selected game information from the slot machine 10 (Step S107). Then, when the delivery controller 101 receives the game information, it sets a language and currency to be used in the selected game (Step S108). In detail, the delivery controller 101 shown in FIG. 3 reads out the language and currency set by the administrator through the second input terminal 106 and sets the language and currency at game execution selected at the slot machine 10.

Figure 13:
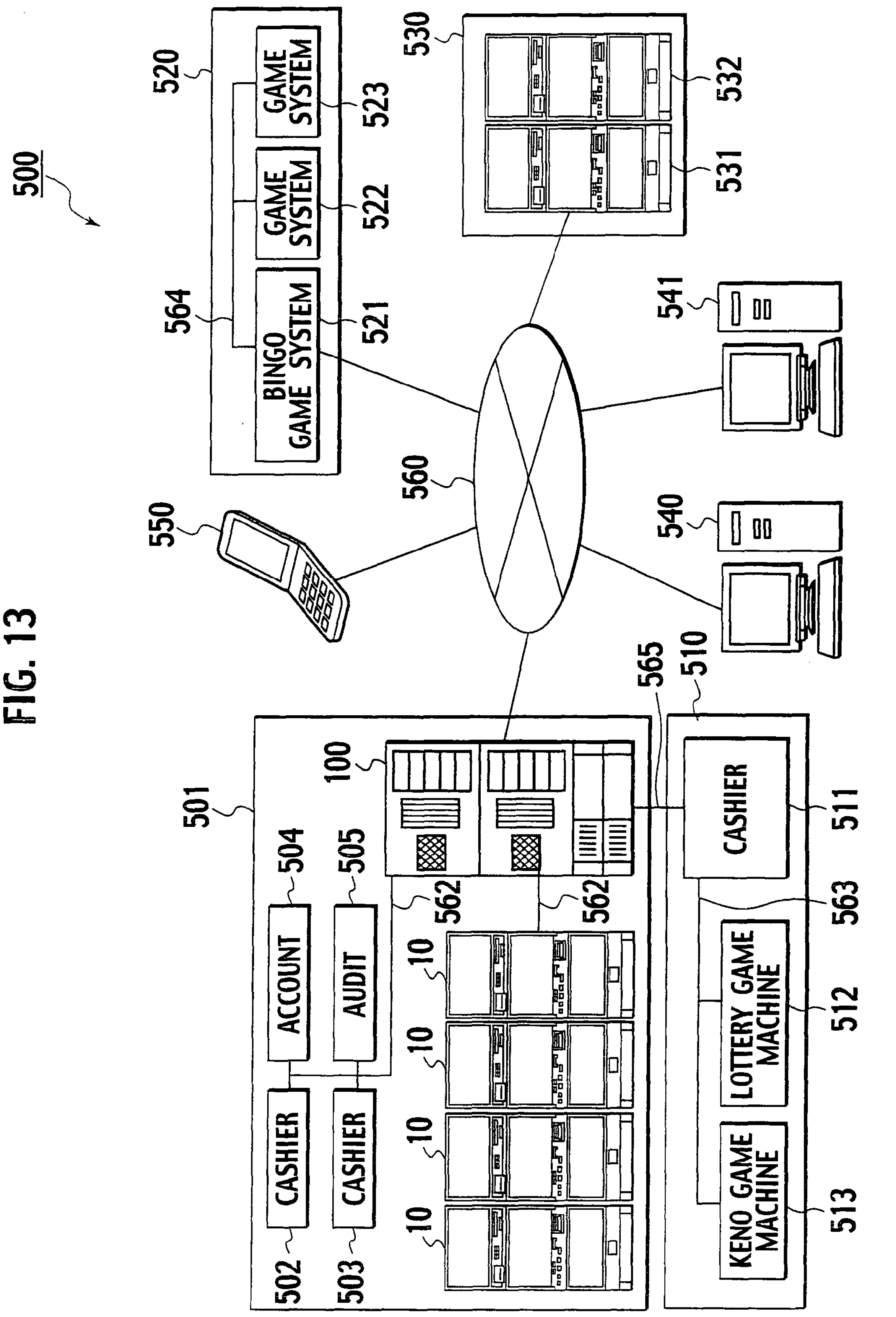
FIG. 13 is a schematic view of a network of a gaming system according to another embodiment of the present invention.

In this processing, as shown in FIG. 13, an image illustrating a list to select a language and currency is displayed on the display 103 of the game delivery server 100 so as to prompt the administrator of the game delivery server 100 to select the language/currency to be used. For example, six languages of "English", "Japanese", "French", "Chinese", "German", and "Italian" are displayed as a language list. At the same time, six currencies of "dollar", "yen", "franc", "yuan", "mark", and "lira" are displayed as a currency list. Moreover, a sentence "Select a language/currency to be used in the game" is displayed.

When the administrator of the game delivery server 100 has recognized that the player of the slot machine 10 is Japanese, the administrator sets "Japanese" as the play language and "yen" as the currency of this slot machine 10.

Then, the selected game software, the language data, the currency data and the authenticating program of the selected game are delivered to the slot machine 10 through the network interface 104 (Step S109 in FIG. 9).

The game controller 40 of the slot machine 10 downloads the game software, the language data, the currency data and the authenticating program into the hard disk drive 43 from the game delivery server 100 (Step S211).

The game controller 40 executes the downloaded authenticating program (Step S212). The authenticating program generates a hash value by executing hash function to the game software and compares it with a hash value stored in the authenticating program in advance. By this, presence of falsification is checked (Step S213). If no falsification is found, it is authenticated as legitimate. If falsification is found, an error is generated.

The game controller 40 sends the authentication result by execution of the authenticating program to the game delivery server 100 (Step S214). The game delivery server 100 receives the authentication result (Step S110).

Thereafter, the game controller 40 executes the game execution processing of the selected game (Step S215). Thus, the player of the slot machine 10 can play the game selected by himself/herself.

After the game is played, the controller 40 sends game processing data to the server 100 (step S216), and writes gaming history data obtained as a result of the game processing into the smart card (step S217).

Also, the delivery controller 101 receives the game processing data (Step S111). The game processing data includes the number of consumed coins, the number of times of games played and the points awarded during the game. These data are stored into a memory 102 as the gaming history, in association with the ID code (Step S112). Then, the process is completed.

In this way, the game delivery server 100 can provide a list of games according to the game player at the slot machine 10 and can also set the language and currency according to the player.

In this way, in the game delivery server 100 and the gaming system according to the present embodiment, the administrator of the game delivery server 100 can set a game list for the player's game selection when game software is to be delivered to the slot machine 10. Therefore, a game executable at each slot machine 10 can be determined arbitrarily in the game delivery server 100. Therefore, if the player of the slot machine 10 is Japanese, setting such as addition of "mahjong game", which is familiar to Japanese, to the game list can be made.

Also, the language and currency to be used in game execution at each slot machine 10 can be determined arbitrarily in the game delivery server 100. Therefore, if the player of the slot machine 10 is Japanese, language and currency setting appropriate to the player can be made such as "Japanese" as the language and "yen" as the currency.

FIG. 13 is a schematic view illustrating a network of the gaming system according to another embodiment of the present invention. A gaming system 500 comprises the game delivery server 100. Further, the gaming system 500 comprises a slot machine 10, a lottery game machine 512, a keno game machine 513, a bingo game system 521, game systems 522, 523, video poker game machines 531, 532, personal computers 540, 541 and a cellular phone 550 as game machines.

The game delivery server 100 is installed in a casino 501. A plurality of slot machines 10, cashiers 502, 503, an account 504 and an audit 505 are connected to the game delivery server 100 through a LAN 562.

Further, the game delivery server 100 is connected to a cashier 511 installed in a restaurant 510 through an intranet 565. Further, the cashier 511 is connected to the lottery game machine 512 and the keno game machine 513 through a LAN 563.

In the present invention, the game delivery server 100 and each game machine may be connected through the intranet 565 in this way. Further, any other device (cashier 511) may be interposed between the game delivery server 100 and the game machines.

Further, the game delivery server 100 is connected to the bingo game system 521 installed at another casino 520 through the Internet 560. The bingo game system 521 is connected to the game machines 522, 523 for playing a bingo game through a LAN 564. Further, the game delivery server 100 is connected to the plurality of video poker game machines 531, 532 installed at a commercial facility 530 through the Internet 560.

Furthermore, the game delivery server 100 is connected to the personal computers 540, 541 and the cellular phone 550 through the Internet 560. Thus, in the present invention, the game delivery server 100 and the game machines may be connected through the Internet. In addition, personal belongings such as the personal computers 540, 541 and the cellular phone 550 may be game machines.

Moreover, in the above-mentioned embodiment, it is configured such that whether the specific game software on which a high bet can be bet is selectable or not is determined depending upon whether or not the points exceed the threshold value, by setting a threshold value of the points. However, it may be configured such that game software on which higher bet can be bet becomes selectable each time the points exceed the threshold value, by setting two or more threshold values.

Although embodiments of the present invention have been described as above, they are only presented as concrete examples, without particularly limiting the present invention. Concrete arrangements of respective units may be changed in design as appropriate. In addition, the effects set forth in the embodiments of the present invention are merely an enumeration of the most preferred effect which occurs from the present invention, and the effects by the present invention is not limited to those set forth in the embodiments of the present invention.

In the above detailed description, mainly characteristic portions have been set forth so that the present invention can be understood more easily. The present invention is not limited to the embodiments set forth in the above detailed description and can be applied to other embodiments, with a wide range of applications. In addition, terms and wordings used in the present specification are used to precisely explain the present invention and are not intended to limit the interpretation of the present invention. Also, those skilled in the art will easily conceive, from the concept of the invention set forth in the present specification, other arrangements, systems or methods included in the concept of the present invention. Therefore, it should be appreciated that the scope of the claims includes equivalent arrangements without deviating from the scope of technical ideas of the present invention. In addition, the purpose of the abstract is to facilitate the Patent Office and general public institutions, or engineers in the technological field who are not familiar with patent and legal terms or specific terms to quickly evaluate technical contents and the essence of this application by simple investigation. Therefore, the abstract is not intended to limit the scope of the invention, which should be evaluated by descriptions of the scope of the claims. Furthermore, it is desirable to take into consideration the already disclosed literatures sufficiently in order to completely understand the objects and specific effects of the present invention.

The above detailed description includes processes executed by a computer. The aforementioned descriptions and expressions are described with a purpose that those skilled in the art will understand them most efficiently. In the present specification, each step used for deriving one result should be understood as a self-consistent process. Also, transmission, reception and recording of electric or magnetic signals are executed in each step. In the processes in respective steps, although such signals are expressed as bits, values, symbols, characters, terms or numerals, it should be noted that these are merely used for convenience of explanation. Additionally, although the processes in respective steps may be described using an expression common to human activities, the processes described in the present specification are executed, in principle, by a variety of devices. Furthermore, other arrangements required to execute respective steps are self-evident from the aforementioned description.

What is claimed is:

1. A game delivery server comprising:
an input port to which player information sent from a gaming machine connected via a network is input;
a memory for storing multiple types of game software to be delivered to the gaming machine;
an input terminal to which a selection signal is input from an administrator of the game delivery server; and
a controller operable to perform sequential steps of:
(a) classify the multiple types of game software into selectable game software and unselectable game software based on the player information,
(b) deliver, to the gaming machine via the network, a list of game software selected from among the selectable game software based on the selection signal input to the input terminal from the administrator of the game delivery server,
(c) receive, from the gaming machine via the network, information on a game selected from the list by a player at the gaming machine,
(d) read out the game software of the game selected at the gaming machine from the memory, and
(e) deliver the game software read out from the memory to the gaming machine via the network.

2. The game delivery server according to claim 1, wherein
the player information includes information on points awarded according to a game execution amount executed by the player in the past, and
the controller is operable to classify the selectable game software and the unselectable game software according to the points.

3. The game delivery server according to claim 1, wherein
the player information includes information on games that have been played by the player in the past, and
the controller is operable to classify game software of the games that have been played by the player in the past as the selectable game software.

4. A game delivery server comprising:
a first input port to which player information sent from a gaming machine connected via a network is input;
a memory for storing multiple types of game software to be delivered to the gaming machine in association with language data in execution, respectively;
a second input port to which a first external signal for selecting multiple game software from among selectable game software in the multiple types of game software is input;
a third input port to which a second external signal for selecting a language in execution of the game software is input;
an input terminal to which a selection signal is input from an administrator of the game delivery server; and
a controller operable to perform sequential steps of:

(a) classify the multiple types of game software into selectable game software and unselectable game software based on the player information, (b) deliver, to the gaming machine via the network, a list of game software selected from among the selectable game software based on the selection signal input to the input terminal from the administrator of the game delivery server, (c) receive, from the gaming machine via the network, information on a game selected from the list by a player at the gaming machine, (d) read out the game software of the game selected at the gaming machine and the language data set by the second external signal from the memory, and (e) deliver the game software and language data read out from the memory to the gaming machine via the network.

5. The game delivery server according to claim 4, wherein the player information includes information on points awarded according to a game execution amount executed by the player in the past, and the controller is operable to classify the selectable game software and the unselectable game software according to the points.

6. The game delivery server according to claim 4, wherein the player information includes information on games that have been played by the player in the past, and the controller is operable to classify the selectable game software and the unselectable game software according to the points.

7. A game delivery server comprising:

a first input port to which player information sent from a gaming machine connected via a network is input;

a memory for storing multiple types of game software to be delivered to the gaming machine in association with currency data to be used, respectively;

a second input port to which a first external signal for selecting multiple game software from among selectable game software in the multiple types of game software is input;

a third input port to which a second external signal for selecting a currency in execution of the game software is input;

an input terminal to which a selection signal is input from an administrator of the game delivery server; and a controller operable to perform sequential steps of:

(a) classify the multiple types of game software into selectable game software and unselectable game software based on the player information, (b) deliver, to the gaming machine via the network, a list of game software selected from among the selectable game software based on the selection signal input to the input terminal from the administrator of the game delivery server, (c) receive, from the gaming machine via the network, information on a game selected from the list by a player at the gaming machine, (d) read out the game software of the game selected at the gaming machine and the currency data set by the second external signal from the memory, and (e) deliver the game software and currency data read out from the memory to the gaming machine via the network.

8. The game delivery server according to claim 7, wherein the player information includes information on points awarded according to a game execution amount executed by the player in the past, and the controller is operable to classify the selectable game software and unselectable game software according to the points.

9. The game delivery server according to claim 7, wherein the player information includes information on a game executed by the player in the past, and the controller is operable to classify game software of the games that have been played by the player in the past as the selectable game software.

10. A gaming system comprising a game delivery server and a gaming machine being connected with the game delivery server via a network wherein, the game deliver server comprises:

a first input port to which player information sent from the gaming machine via the network is input;

a memory for storing multiple types of game software to be delivered to the gaming machine via the network;

an input terminal to which a selection signal is input from an administrator of the game delivery server; and a delivery controller operable to perform sequential steps of:

(a) classify the multiple types of game software into selectable game software and unselectable game software based on the player information, (b) deliver, to the gaming machine via the network, a list of game software selected from among the selectable game software based on the selection signal input to the input terminal from the administrator of the game delivery server, (c) receive, from the gaming machine via the network, information on a game selected from the list by a player at the gaming machine, (d) read out the game software of the game selected at the gaming machine from the memory, and (e) deliver the game software read out from the memory to the gaming machine via the network, the gaming machine comprises:

a player data reader for identifying the player;

a display for displaying a list of the selectable game software;

a second input port to which an external signal for selecting a desired game software from among the selectable game software is input; and a game controller operable to:

(a) send information of the selected game software to the delivery server, and (b) execute the game software delivered from the delivery server.

11. A controlling method for a game delivery server comprising sequential steps of:

inputting and storing player information sent from a gaming machine connected via a network;

classifying multiple types of game software stored in a memory based on the player information into selectable game software and unselectable game software;

delivering a list of game software determined from among the selectable game software according to an external input from an administrator of the game delivery server to the gaming machine via the network; and reading out the game software of the game selected at the gaming machine to deliver the game software read out to the gaming machine.

12. The controlling method for a game delivery server according to claim 11, wherein the player information includes information on points awarded according to a game execution amount executed by a player in the past, and the method further comprises, classifying the selectable game software and the unselectable game software according to the points.

13. The controlling method for a game delivery server according to claim 11, wherein the player information includes information on games that have been played by a player in the past, and the method further comprises, classifying the game software of the games that have been played by the player in the past as the selectable game software.

14. A controlling method for a game delivery server comprising sequential steps of:

inputting player information sent from a gaming machine via a network;

classifying multiple types of game software stored in a memory based on the player information into selectable game software and unselectable game software;

selecting the selectable game software from among the multiple types of game software stored in the memory based on a first external signal from an administrator of the game delivery server;

selecting a language for executing the multiple types of game software stored in the memory based on a second external signal;

sending a list of game software selected from among the selectable game software by the first external signal from the administrator of the game delivery server to the gaming machine; and reading out the game software of the game selected at the gaming machine and the language data selected by the second external signal, and deliver the game software and language data read out to the gaming machine.

15. The controlling method for a game delivery server according to claim 14, wherein the player information includes information on points awarded according to a game execution amount played by a player in the past, and the method further comprises, classifying the selectable game software and the unselectable game software according to the points.

16. The controlling method for a game delivery server according to claim 14, wherein the player information includes information on games that have been played by a player in the past, and the method further comprises, classifying the game software of the games that have been played by the player in the past as the selectable game software.

17. A controlling method for a game delivery server comprising sequential steps of:

inputting player information sent from a gaming machine via a network;

classifying multiple types of game software stored in a memory based on the player information into selectable game software and unselectable game software;

selecting the selectable game software from among the multiple types of game software stored in the memory based on a first external signal from an administrator of the game delivery server;

selecting a currency in execution of the multiple types of game software stored in the memory based on a second external signal;

sending a list of game software selected from among the selectable game software by the first external signal from the administrator of the game delivery server to the gaming machine; and reading out the game software of the game selected at the gaming machine and the currency data selected out of the memory by the second external signal, and deliver the game software and currency data read out to the gaming machine.

18. The controlling method for a game delivery server according to claim 17, wherein the player information includes information on points awarded according to a game execution amount played by a player in the past, and the method further comprises, classifying the selectable game software and the unselectable game software according to the points.

19. The controlling method for a game delivery server according to claim 17, wherein the player information includes information on games that have been played by a player in the past, and the method further comprises, classifying the game software of the games that have been played by the player in the past as the selectable game software.

* * * * *